3 Sheets—Sheet 2.

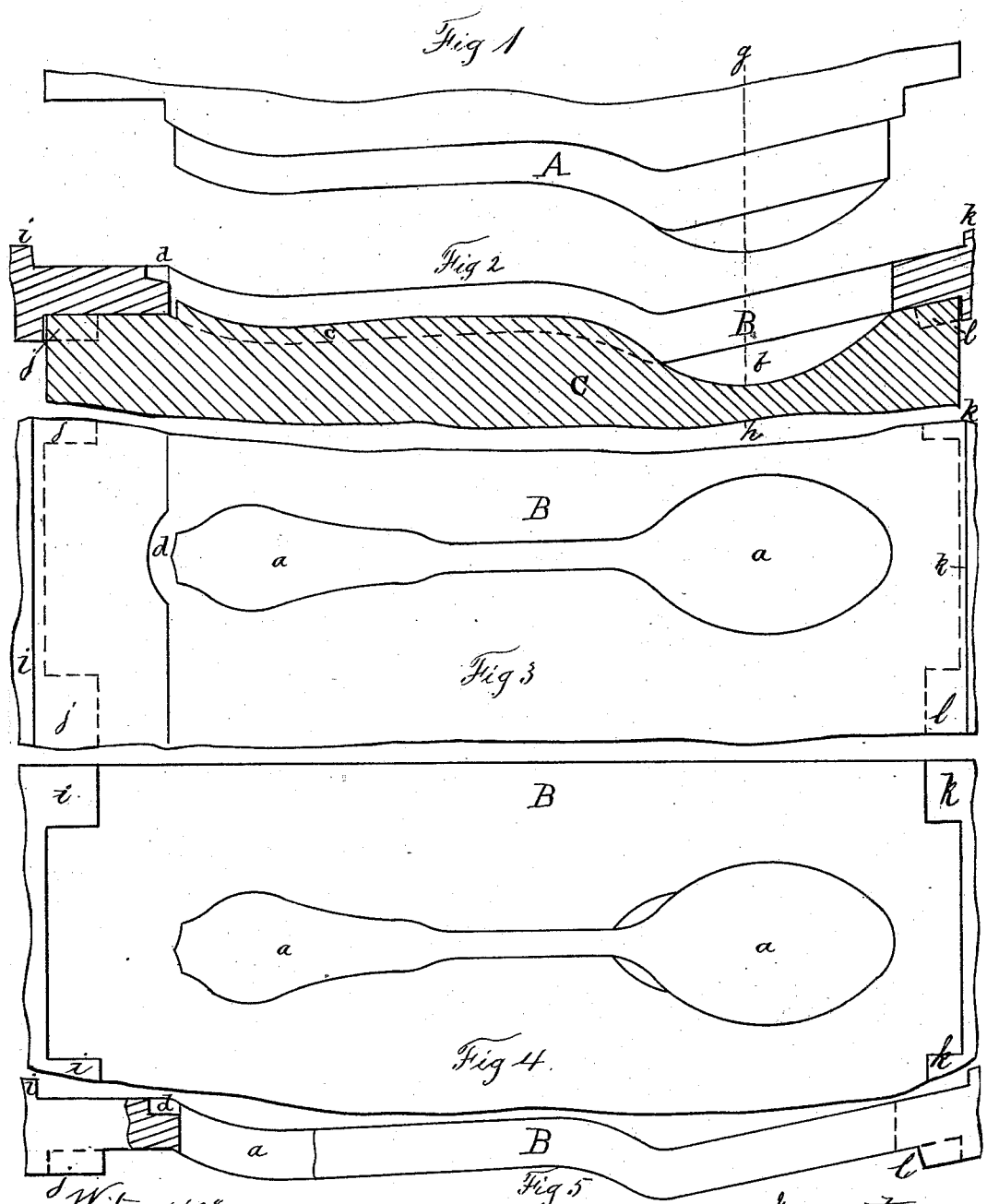

T. SHAW.
Dies for the Manufacture of Spoons.

No. 215,485. Patented May 20, 1879.

Witnesses
James M. Hicks
N. H. Hicks

Inventor
Thomas Shaw
by E. L. Sherman
Attorney

T. SHAW.
Dies for the Manufacture of Spoons.

No. 215,485. Patented May 20, 1879.

Witnesses
James M. Hicks
W. H. Hicks

Inventor
Thomas Shaw by E. L. Sherman
Attorney

UNITED STATES PATENT OFFICE.

THOMAS SHAW, OF ORANGE, NEW JERSEY.

IMPROVEMENT IN DIES FOR THE MANUFACTURE OF SPOONS.

Specification forming part of Letters Patent No. 215,485, dated May 20, 1879; application filed July 16, 1878.

*To all whom it may concern:*

Be it known that I, THOMAS SHAW, of Orange, in the county of Essex and State of New Jersey, have invented a new and useful Improvement in Dies for the Manufacture of Spoons, Ladles, and Similar Articles, which improvement is fully set forth in the following specification, reference being had to the accompanying drawings, in which—

Figure 6:
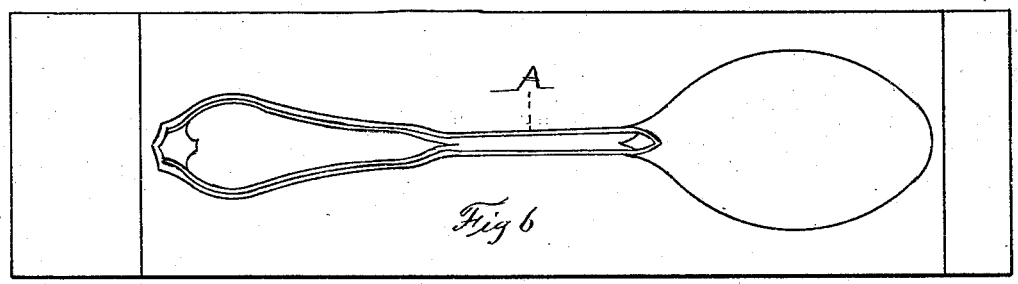
Figure 7:
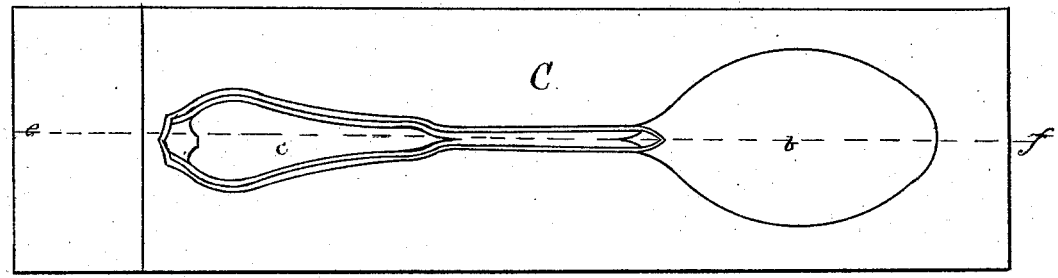
Figure 8:
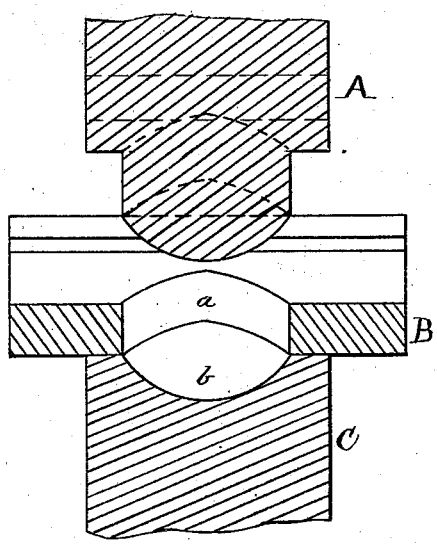
Figure 9:
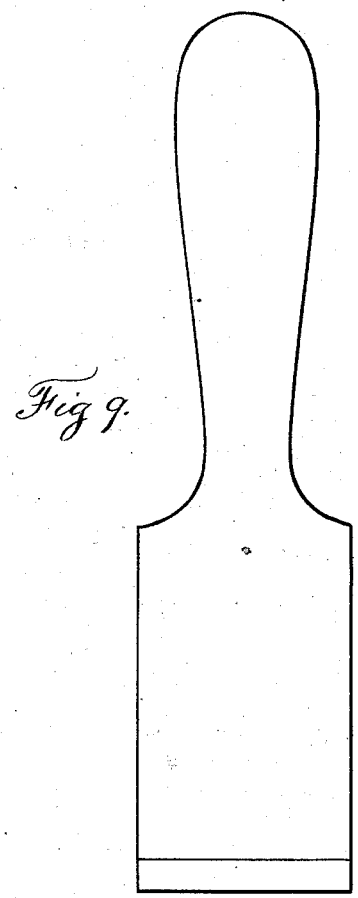
Figure 10:
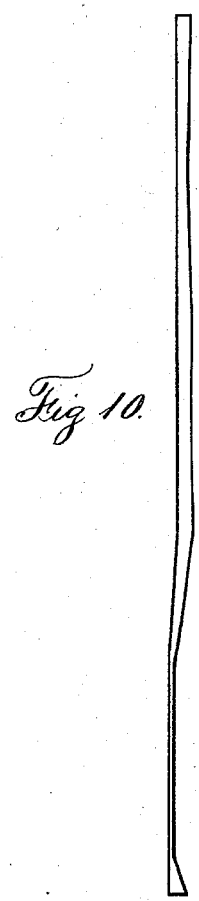

Figure 1 represents a side elevation of upper or male die. Fig. 2 is a section on line $e\ f$ of Fig. 7, showing the intermediate die in its place above the lower die. Fig. 3 is a top view of the intermediate die. Fig. 4 is a bottom view of the same. Fig. 5 is a side view of the same, with part in section to show depression. Fig. 6 is a plan view from under side of upper or male die, Fig. 1. Fig. 7 is a plan view of lower die. Fig. 8 is a section of Figs. 1 and 2 through the line $g\ h$. Fig. 9 is a plan view of the spoon-blank. Fig. 10 is a side view of the same.

The usual method of making spoons is, after the blanks have been properly graded, to stamp them out by means of dies, and afterward clip the edges by means of clipping-dies. This is known as the "Whiting process," and not only requires two operations, but spoons requiring a thread-line or any other delicate ornamentation close to the edge could not be made by this process, because the action of the clipping-dies destroys or injures such ornamentation.

By the method embraced in the English patent of Cope plain spoons are formed and cut at one operation; but when any ornamentation on the spoon is required another and distinct operation is necessary.

Both these modes of making spoons are expensive by reason of the extra operation required; and, moreover, after the spoon has been cut and shaped, very great care and accuracy are required in placing it under other dies for ornamentation, particularly when any delicate design is desired near the edge of the spoon.

The purpose of my invention is to overcome these objections and cheapen the cost and expense of manufacture, both in labor and time, and produce at one operation a spoon perfect in form, having any desired ornamentation or embossing upon the top or bottom of the spoon or close to the edge, and only requiring the regular use of the trimming belt or file.

To accomplish this I combine in one machine the cutting and ornamenting of spoons by having an intermediate die and cutter separate and distinct from the ornamenting-dies, and so made as to rest on the lower die. I thus save the time and expense of the second operation heretofore required, and, furthermore, produce by my combination a more perfect spoon in all its details. I form a cutter and plunger (marked A, Fig. 1) of the exact size of the spoon desired, which I call the "upper or male die." This cutter and plunger is so constructed and arranged that it cuts the blank with perfect ease and saves the die from injury.

The intermediate die, B, Figs. 3, 4, and 5, has a cut or opening, $a$, made to fit exactly the cutter and plunger of the male die, A. The lower die, C, Figs. 2 and 8, has a depression, $b$, of the same size and shape as the elevation for the bowl in the cutter and plunger of the upper or male die, A, and an elevation, $c$, for the handle and neck of the spoon. This elevation $c$ also serves as a stay and guide to keep the intermediate die, B, in place on the die C, and has on its face the ornamentation or design desired upon the under side of the spoon, while the desired ornamentation of the top is on the face of the cutter and plunger A.

The intermediate die and cutter, B, is made of a form and shape so as to rest evenly and uniformly on the die C, with its opening $a$ exactly over the depression $b$, and is made a little longer and wider than the upper and lower dies for increased strength, although this is not necessary. It should, however, be made of sufficient thickness to avoid breaking or splitting. This intermediate die and cutter is held in proper position on the die C by means of shoulders and lugs $i\ j\ k\ l$, although other suitable means may be employed.

The cutter and plunger A should have sufficient elevation to allow it to pass through the intermediate die and cutter and give the requisite pressure upon the die C.

The intermediate die and cutter, B, has a recess, $d$, Fig. 3, in which the handle end of the blank is placed, so that the blank shall always be in proper position to be acted upon by the cutter.

The operation is as follows: The blank is placed on the top of the intermediate die and cutter, B, with the handle end resting in the recess $d$. The cutter and plunger A is then pressed or forced by sufficient power upon the blank, so as to force the spoon portion cut from the blank through the intermediate die and cutter, B, and press the spoon thus cut with sufficient power upon the lower die, C, to form the ornamentation.

The cutting, shaping, and forming the spoon are effected by the combined action of the dies A and B. The ornamentation and embossing are done by the combined action of the dies A and C, and a complete spoon is thus made at one operation.

The waste or surplus metal of the blank will be left upon the top of the intermediate die, and is removed when this die is taken from its place. The complete spoon is then found resting upon the lower die, C, and is perfect in all its details, ornamented and embossed as desired, even close to the edge, and only requiring the regular use of the trimming belt or file.

What I claim as my invention, and desire to secure by Letters Patent, is—

The partible die consisting of the three parts A, B, and C, as and for the purpose set forth.

THOMAS SHAW.

Witnesses:
   E. L. SHERMAN,
   E. EMERSON.